US011542907B2

(12) United States Patent
Yamakawa et al.

(10) Patent No.: US 11,542,907 B2
(45) Date of Patent: Jan. 3, 2023

(54) STOP POSITION CONTROLLER FOR ENGINE

(71) Applicant: Mazda Motor Corporation, Hiroshima (JP)

(72) Inventors: Hirotaka Yamakawa, Aki-gun (JP); Hiromu Sugano, Aki-gun (JP); Kenji Tanimura, Aki-gun (JP); Toru Kobayashi, Aki-gun (JP); Daisuke Shimo, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/665,181

(22) Filed: Feb. 4, 2022

(65) Prior Publication Data

US 2022/0307457 A1 Sep. 29, 2022

(30) Foreign Application Priority Data

Mar. 25, 2021 (JP) .............................. JP2021-051345

(51) Int. Cl.
*F02N 19/00* (2010.01)

(52) U.S. Cl.
CPC ...... *F02N 19/005* (2013.01); *F02N 2019/008* (2013.01)

(58) Field of Classification Search
CPC ............. F02N 19/005; F02N 2019/008; F02N 11/0814; F02N 11/0848; F02N 2300/2011; F02D 41/042; F02D 13/0219; F02D 13/0261; F02D 13/0238; F02D 13/08; F02D 2041/001; F02D 41/0002
See application file for complete search history.

(56) References Cited

U.S. PATENT DOCUMENTS

2013/0080036 A1* 3/2013 Yamauchi ............. F02D 41/065 701/112
2018/0058407 A1* 3/2018 Hayashima ........... F02N 19/005

FOREIGN PATENT DOCUMENTS

JP 2013060827 A 4/2013

OTHER PUBLICATIONS

European Patent Office, Extended European Search Report Issued in Application No. 21216195.4, dated Jun. 13, 2022, Germany, 7 pages.

* cited by examiner

*Primary Examiner* — Xiao En Mo
(74) *Attorney, Agent, or Firm* — Alleman Hall Creasman & Tuttle LLP

(57) ABSTRACT

An intake variable valve timing mechanism (VVT) that collectively changes an intake valve close timing as a close timing of a plurality of intake valves and a control device that controls an engine including a plurality of injectors and the intake VVT are provided. When a specified engine stop condition is satisfied, a fuel cut is performed to stop a fuel supply into a plurality of cylinders by the injector. After the fuel cut, the intake VVT is controlled such that a retarded amount of the intake valve close timing immediately before a stop of a stop-time compression stroke cylinder as a cylinder stopped in a compression stroke from intake bottom dead center is larger than a retarded amount of the intake valve close timing immediately before a stop of a stop-time expansion stroke cylinder as a cylinder stopped in an expansion stroke from the intake bottom dead center.

9 Claims, 12 Drawing Sheets

STOP POSITION CONTROLLER FOR ENGINE

TECHNICAL FIELD

The present disclosure relates to a stop position controller that is provided for an engine and includes start means capable of forcibly starting the engine by causing a crankshaft to rotate.

BACKGROUND ART

Conventionally, in a vehicle on which an engine is mounted, in order to improve fuel efficiency, the engine is automatically stopped, and thereafter the engine is forcibly started by using start means.

Here, in a multicylinder engine including a plurality of cylinders, since torque that is requested to the start means in order to start the engine varies according to a position of each of the cylinders (a piston position in each of the cylinders) at an engine stop, it is required to set the position of each of the cylinders to a position suited for the start at the engine stop.

To handle such a problem, for example, for the engine disclosed in JP2013-60827A, the following control is executed immediately before the stop of the engine. That is, control is executed to increase an opening degree of a throttle valve after completion of air intake of a stop-time expansion stroke cylinder (a final expansion cylinder in JP2013-60827A) as a cylinder that is stopped in an expansion stroke, so as to increase an intake amount of a stop-time compression stroke cylinder (a final compression cylinder in JP2013-60827A) as a cylinder that is stopped in a compression stroke.

SUMMARY OF THE INVENTION

Problem to be Solved by the Invention

Here, at a time immediately before the stop of the engine, a pressure in an intake passage is increased in conjunction with a reduction in an engine speed. Accordingly, at the time immediately before the stop of the engine, the intake amount in the stop-time compression stroke cylinder tends to be larger than the intake amount in the stop-time expansion stroke cylinder whose intake stroke is terminated earlier than the stop-time compression stroke cylinder. In this way, in the case where, as in JP2013-60827A, the opening degree of the throttle valve is simply increased immediately before the engine stop to increase the intake amount of the stop-time compression stroke cylinder, the intake amount of the stop-time compression stroke cylinder becomes excessive, which possibly shifts a position of the stop-time compression stroke cylinder to bottom dead center side from an appropriate position. More specifically, the intake amount of the stop-time compression stroke cylinder becomes excessively larger than the intake amount of the stop-time expansion stroke cylinder. Accordingly, a force by the intake air of the stop-time expansion stroke cylinder to push down a piston in the cylinder (in other words, a force of lifting the piston in the stop-time compression stroke cylinder) is insufficient for a force by the intake air of the stop-time compression stroke cylinder to push down the piston in the cylinder, which possibly shifts the position of the stop-time compression stroke cylinder to the bottom dead center side from the appropriate position. Thus, with the device disclosed in JP2013-60827A, it may be impossible to reduce the torque of the start means that is required to start the engine.

The present disclosure has been made in view of circumstances as described above and therefore has a purpose of providing a stop position controller for an engine capable of reliably reducing torque of a start means that is consumed for an engine start by controlling a position of each cylinder at an engine stop to a position suited for the start.

Means for Solving the Problem

In order to solve the above problem, the present disclosure provides a stop position controller provided for an engine including a plurality of cylinders; a plurality of intake ports, each of which communicates with respective one of the cylinders; a plurality of intake valves, each of which opens or closes respective one of the intake ports; a plurality of injectors that supply fuel to a respective one of the cylinders; a piston that is provided in each of the cylinders in a reciprocal manner; a crankshaft that rotates in an interlocking manner with reciprocating motion of the piston; and a motor capable of forcibly starting the engine by causing the crankshaft to rotate. The stop position controller includes an intake variable valve timing mechanism (VVT) that collectively changes an intake valve close timing as a close timing of the plurality of intake valves; and a control device that controls the engine including the injectors and the intake VVT. When a specified engine stop condition is satisfied, the control device performs a fuel cut to stop a fuel supply into the cylinders by the injectors and, after the fuel cut, controls the intake VVT such that a retarded amount of the intake valve close timing immediately before a stop of a stop-time compression stroke cylinder, which is the cylinder stopped in a compression stroke, from intake bottom dead center is larger than a retarded amount of the intake valve close timing immediately before a stop of a stop-time expansion stroke cylinder, which is the cylinder stopped in an expansion stroke, from the intake bottom dead center.

In the present disclosure, after the fuel cut, the retarded amount of the intake valve close timing immediately before the stop of the stop-time compression stroke cylinder from the intake bottom dead center is set to be larger than the retarded amount of the intake valve close timing immediately before the stop of the stop-time expansion stroke cylinder from the intake bottom dead center. When the retarded amount of the intake valve close timing from the intake bottom dead center is increased, a blow-back amount of intake air from inside of the cylinder to the intake port is increased, and an intake amount in the cylinder is reduced. Thus, according to the present disclosure, it is possible to suppress an increase in the intake amount of the stop-time compression stroke cylinder, which is likely to be increased in association with a pressure increase in an intake passage immediately before an engine stop, and it is thus possible to prevent the intake amount of the stop-time compression stroke cylinder from becoming excessively larger than the intake amount of the stop-time expansion stroke cylinder. Therefore, it is possible to prevent a position of the stop-time compression stroke cylinder from being shifted to the bottom dead center side from an appropriate position. In other words, it is possible to set the stop position of each of the cylinders including the stop-time compression stroke cylinder (the position of each of the cylinders at the engine stop) to a position suited for the start, and it is thus possible to reliably reduce torque of the motor consumed for the engine start.

In the above configuration, preferably, in a case where an engine speed becomes lower than a specified reference speed after the fuel cut, the control device retards the intake valve close timing to a specified pre-valve close timing by the intake VVT, and after the intake valve close timing reaches the pre-valve close timing and a specified timing arrives, retards the intake valve close timing from the pre-valve close timing by the intake VVT.

According to this configuration, it is possible to prevent such a situation where the intake valve close timing of the stop-time compression stroke cylinder immediately before the engine stop is not sufficiently retarded due to a response delay of the intake VVT. In other words, it is possible to secure the retarded amount of the intake valve close timing of the stop-time compression stroke cylinder immediately before the engine stop from the intake bottom dead center. Therefore, it is possible to reliably increase the blow-back amount of the intake air from the inside of the stop-time compression stroke cylinder to the intake port and reliably suppress the increase in the intake amount of the stop-time compression stroke cylinder.

In the above configuration, preferably, the engine includes a throttle valve that opens and closes an intake passage communicating with the plurality of intake ports, and the control device predicts a stop position of the stop-time compression stroke cylinder after the fuel cut and increases an opening degree of the throttle valve when predicting that the stop position of the stop-time compression stroke cylinder is on a top dead center side from a specified target range.

As described above, the present disclosure can increase a possibility of setting the stop position of each of the cylinders at the position suited for the start. However, depending on a degree of the reduction in the engine speed immediately before the engine stop and the like, there is a possibility that the piston in the stop-time compression stroke cylinder is not sufficiently lifted immediately before the engine stop and thus the stop position of the cylinder is located on a top dead center side from the target range. Meanwhile, in this configuration, the opening degree of the throttle valve is increased in the case where it is predicted that the stop position of the stop-time compression stroke cylinder is located on the top dead center side from the target range. When the opening degree of the throttle valve is increased, a pressure in the intake passage is increased. Accordingly, it is possible to increase the intake amount of the stop-time compression stroke cylinder, whose intake stroke is performed later than the stop-time expansion stroke cylinder, and it is thus possible to suppress the piston in the stop-time compression stroke cylinder from being lifted. Thus, according to this configuration, it is possible to suppress the stop position of the stop-time compression stroke cylinder from being shifted toward the top dead center side from the target range, and it is thus possible to further reliably set the stop position of each of the cylinders within the target range, that is, a range suited for the start, and further reliably reduce the torque of the start means consumed for the engine start.

Here, it has been found that, in the case where the stop position of the stop-time compression stroke cylinder is set to be equal to or larger than 40 degrees before compression top dead center and equal to or smaller than 75 degrees before the compression top dead center in crank angle in a six-cylinder engine having six cylinders, the engine can be started while torque of the motor is suppressed to be equal to or lower than a specified value.

In this way, in the configuration that the engine has the six cylinders, the target range is preferably set to a range of 40 degrees or larger before compression top dead center and 75 degrees or smaller before the compression top dead center in crank angle.

Advantage of the Invention

As it has been described so far, according to the stop position controller for an engine in the present disclosure, it is possible to reliably reduce the torque of the start means consumed for the engine start by controlling the position of each of the cylinders at the engine stop to the position suited for the start.

MODES FOR CARRYING OUT THE INVENTION (1) Overall Configuration

Figure 1:
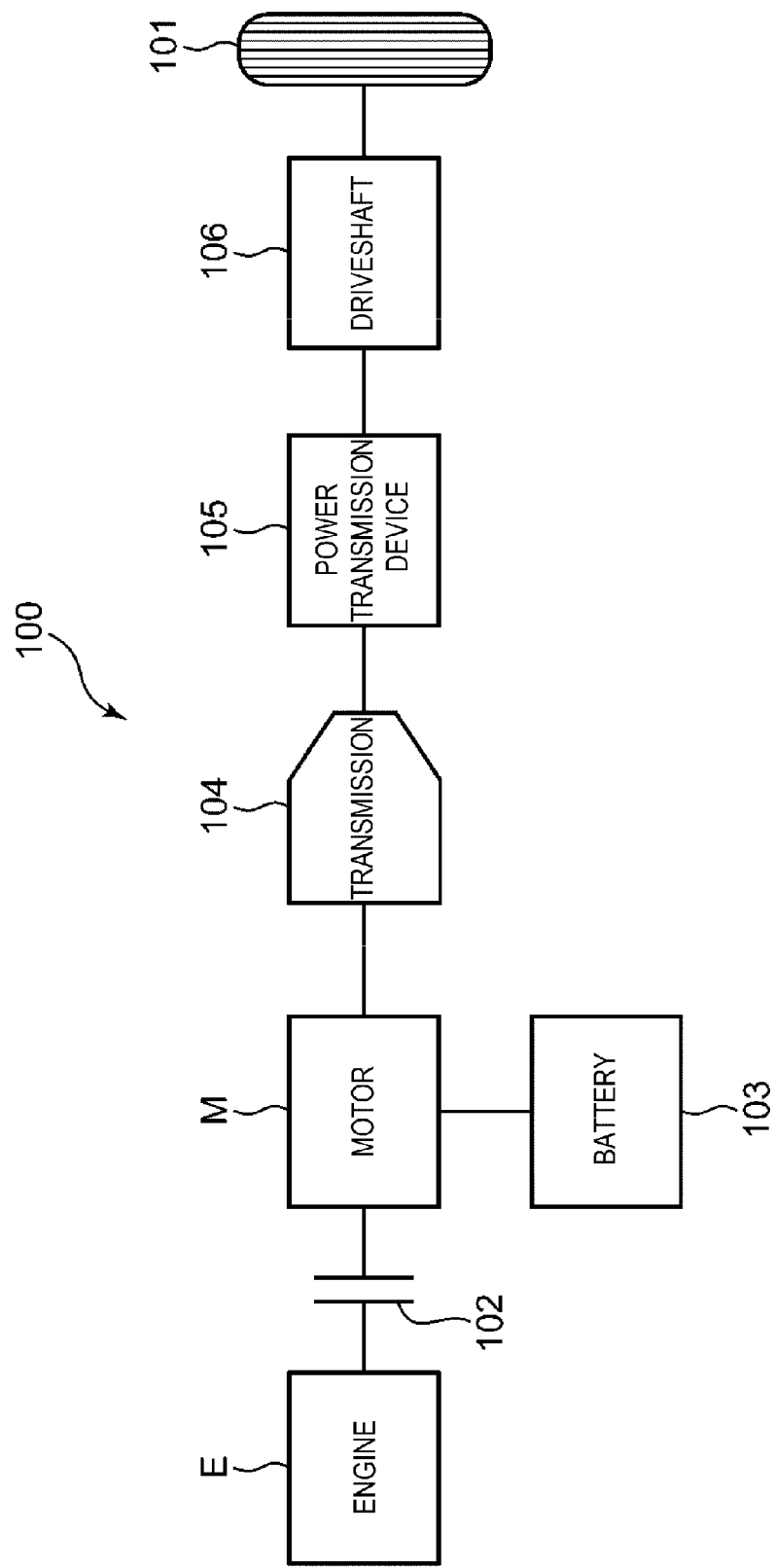
FIG. 1 is a schematic configuration diagram of a vehicle on which an engine, to which a stop position controller according to an embodiment of the present disclosure is applied, is mounted.

FIG. 1 is a schematic configuration diagram of a vehicle 100 on which an engine E, to which a stop position controller for an engine according to an embodiment of the present disclosure is applied, is mounted. In this embodiment, the vehicle 100 is a hybrid vehicle that includes the engine E and a motor M as drive sources of the vehicle 100 (a wheel 101).

As illustrated in FIG. 1, the vehicle 100 includes, in addition to the wheel 101, the engine E, and the motor M, a clutch 102 that couples an output shaft of the engine E and a rotary shaft of the motor M in an engageable and disengageable manner, a battery 103 that exchanges electric power with the motor M, a transmission 104 that is coupled to the motor M, and a power transmission device 105 that includes a driveshaft 106 coupled to the wheel 101, a differential gear, and the like and couples the transmission 104 and the driveshaft 106.

(Engine Configuration)

Figure 2:
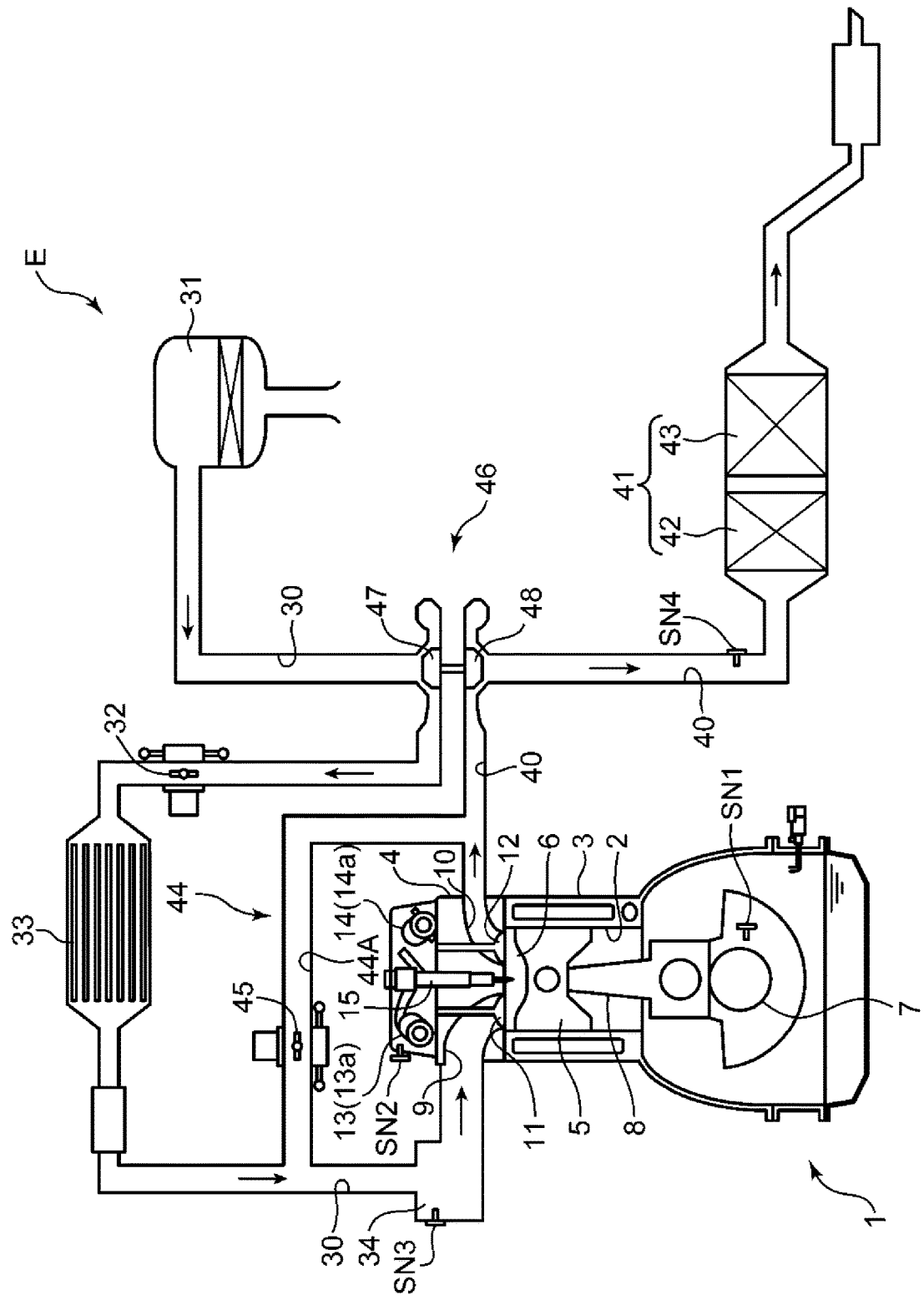
FIG. 2 is a schematic configuration view of the engine.

FIG. 2 is a schematic configuration view of the engine E. The engine E includes an engine body 1, an intake passage 30 through which intake air to be introduced into the engine body 1 flows, an exhaust passage 40 through which exhaust gas discharged from the engine body 1 flows, and an exhaust gas recirculation (EGR) device 44 that circulates EGR gas as some of the exhaust gas flowing through the exhaust passage 40 into the intake passage 30. The engine E also includes a turbocharger 46 having a turbine 48 that is provided in the exhaust passage 40 and a compressor 47 that is rotationally driven by the turbine 48 provided in the intake passage 30. The engine E in this embodiment is a four-stroke diesel engine and is driven when being supplied with fuel that has diesel fuel as a main component.

The engine body 1 has a cylinder block 3 that is formed with a cylinder 2 and a cylinder head 4 that covers the cylinder block 3.

Figure 3:
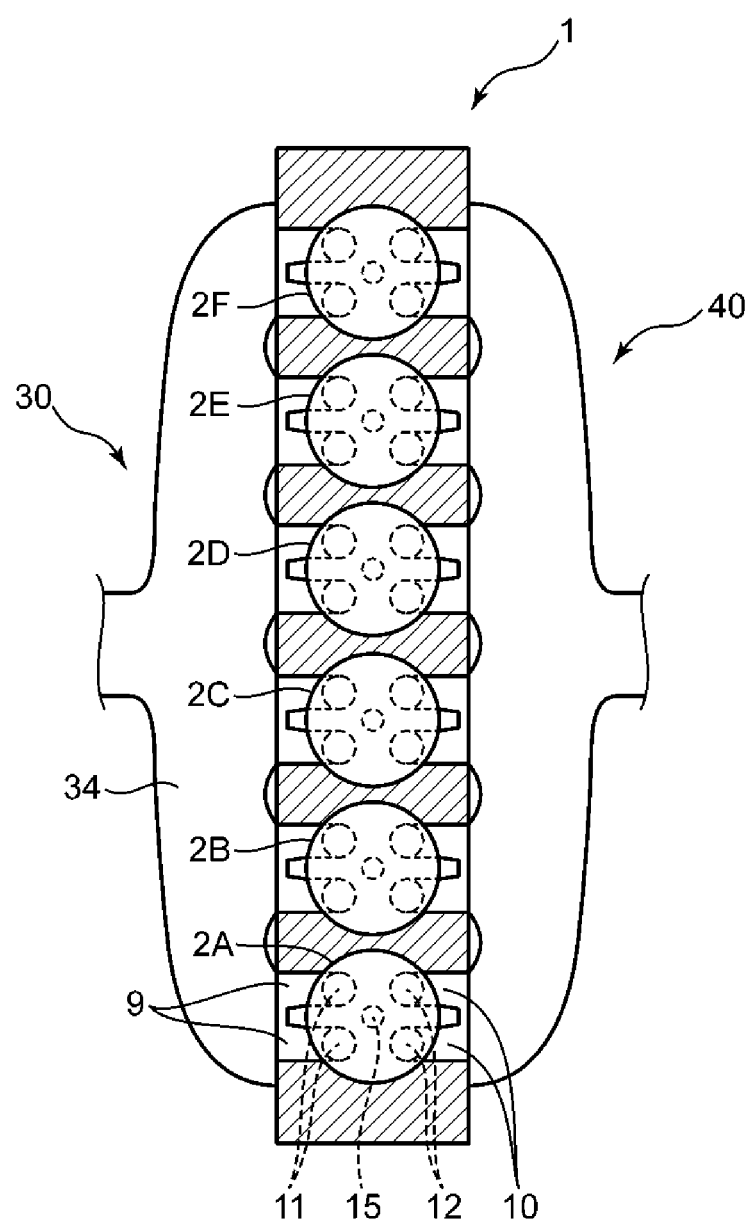
FIG. 3 is a schematic cross-sectional view of an engine body.

FIG. 3 is a schematic cross-sectional view of the engine body 1. As illustrated in FIG. 3, the engine E in this embodiment is an in-line six-cylinder engine. The engine body 1 (in detail, the cylinder block 3) is formed with six cylinders 2 (a first cylinder 2A, a second cylinder 2B, a third cylinder 2C, a fourth cylinder 2D, a fifth cylinder 2E, and a sixth cylinder 2F in an order from one side along an arrangement direction of the cylinders 2) that are aligned in a line.

A piston 5 is accommodated in each of the cylinders 2 in a reciprocal manner. A combustion chamber 6 is defined above the piston 5 in each of the cylinders 2. Each of the pistons 5 is coupled to a crankshaft 7 via a connecting rod 8. The crankshaft 7 rotates about a center axis thereof according to reciprocating motion of each of the pistons 5.

An injector 15 that injects fuel into the cylinder 2 (the combustion chamber 6) is attached to the cylinder head 4 for each of the cylinders 2, and one injector 15 is provided for per cylinder 2. The piston 5 reciprocates when an air-fuel mixture of the supplied fuel and supplied air is burned in the combustion chamber 6 and the piston 5 is pushed down by an expansion force generated by the combustion.

The cylinder head 4 is provided with, for each of the cylinders 2, an intake port 9 used to introduce the intake air to each of the cylinders 2 (the combustion chamber 6), an intake valve 11 that opens and closes the intake port 9, an exhaust port 10 used to discharge the exhaust gas, which is generated in each of the cylinders 2 (the combustion chamber 6), and an exhaust valve 12 that opens and closes the exhaust port 10. A valve type of the engine body 1 is a four-valve type having two intake valves and two exhaust valves. For each of the cylinders 2, two each of the intake ports 9 and the exhaust ports 10 are provided. For each of the cylinders 2, two each of the intake valves 11 and the exhaust valves 12 are provided.

Figure 4:
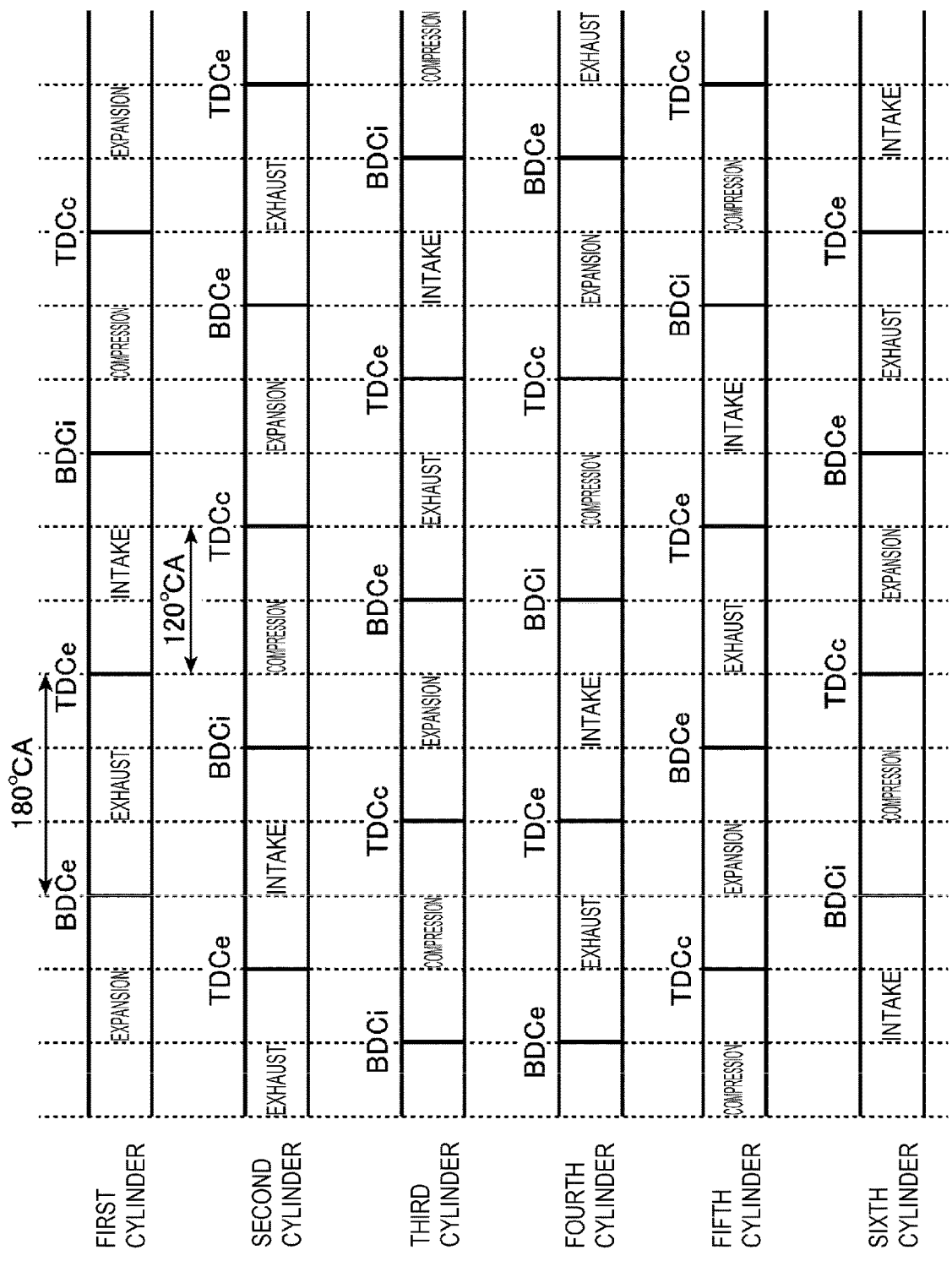
FIG. 4 is a chart illustrating strokes that are performed in each cylinder of the engine.

FIG. 4 is a chart illustrating strokes that are performed in each of the cylinders 2. As described above, the engine E is the four-stroke engine. Thus, in each of the cylinders 2, an intake stroke, a compression stroke, an expansion stroke, and an exhaust stroke are sequentially performed in this order. The engine E is the in-line six-cylinder engine. In this way, the piston 5, which is provided in each of the cylinders 2A to 2F, reciprocates with a phase difference of 120° CA (120° in a crank angle), and the combustion occurs in an order of the first cylinder 2A, the fifth cylinder 2E, the third cylinder 2C, the sixth cylinder 2F, the second cylinder 2B, and the fourth cylinder 2D every 120° CA.

Here, the intake, compression, expansion, and exhaust strokes described in the present disclosure refer to periods that are acquired by dividing one combustion cycle, that is, a period in which the crankshaft 7 rotates twice (360° CA) into four equal periods by the crank angle, and respectively refer to periods in which intake, compression, expansion, and exhaust are primarily performed.

More specifically, the intake stroke described in the present disclosure does not refer to a period from time at which the intake valve 11 actually starts being opened to time at which the intake valve 11 is closed, but refers to a period in which the piston 5 is located between exhaust top dead center TDCe and intake bottom dead center BDCi. The compression stroke refers to a period in which the piston 5 is located between the intake bottom dead center BDCi and compression top dead center TDCc. The expansion stroke refers to a period in which the piston 5 is located between the compression top dead center TDCc and expansion bottom dead center BDCe. The exhaust stroke refers to a period in which the piston 5 is located between the expansion bottom dead center BDCe and the exhaust top dead center TDCe.

Here, the compression top dead center TDCc is a position on the uppermost side (a near side of the cylinder head 4) in a reciprocation range of the piston 5 and is a position that the piston 5 reaches after the intake valve 11 is closed and before the exhaust valve 12 is opened. Each of the expansion bottom dead center BDCe, the exhaust top dead center TDCe, and the intake bottom dead center BDCi is a position of the piston 5 at the time when the crankshaft 7 rotates positively for 180° CA, 360° CA, and 540° CA from a state where the piston 5 is located at the compression top dead center TDCc. Hereinafter, the position of the piston 5 will appropriately be described as a position of the cylinder 2.

The intake valve 11 in each of the cylinders 2 is driven by a valve mechanism 13 that includes an intake camshaft disposed in the cylinder head 4. The valve mechanism 13 for the intake valves 11 includes an intake S-VT 13a capable of changing open and close timings of the intake valves 11 collectively. Similarly, the exhaust valve 12 in each of the cylinders 2 is driven by a valve mechanism 14 that includes an exhaust camshaft disposed in the cylinder head 4. The valve mechanism 14 for the exhaust valves 12 includes an exhaust S-VT 14a capable of changing open and close timings of the exhaust valves 12 collectively. The intake S-VT 13a (the exhaust S-VT 14a) is a so-called phase-type variable mechanism, and simultaneously changes open initiation timing IVO (EVO) and close timing IVC (EVC) of each of the intake valves 11 (each of the exhaust valves 12) by the same amount. The intake S-VT 13a is one example of a variable valve timing mechanism (VVT).

The intake passage 30 is connected to one side surface of the cylinder head 4 so as to communicate with the intake port 9. In the intake passage 30, an air cleaner 31, the compressor 47, a throttle valve 32, an intercooler 33, and a surge tank 34 are provided in this order from an upstream side. The compressor 47 is rotationally driven by the turbine 48 as described above and compresses (supercharges) the air that flows through the compressor 47. The air that has been compressed by the compressor 47 and then cooled by the intercooler 33 is introduced into the cylinder 2 (the combustion chamber 6). The throttle valve 32 is a valve capable of opening and closing the intake passage 30. An amount of air that flows through the intake passage 30, and hence, an amount of the intake air that is introduced into the cylinder 2 (the combustion chamber 6) varies according to an opening degree of the throttle valve 32.

The exhaust passage 40 is connected to another side surface of the cylinder head 4 so as to communicate with the exhaust port 10. The exhaust passage 40 is provided with the turbine 48 and an exhaust purifier 41 for purifying the exhaust gas in this order from an upstream side. The exhaust purifier 41 includes a three-way catalyst 42 and a diesel particulate filter (DPF) 43. The turbine 48 rotates by receiving energy of the exhaust gas flowing through the exhaust passage 40, and the compressor 47 rotates in conjunction therewith.

The EGR device 44 includes an EGR passage 44A that connects the exhaust passage 40 and the intake passage 30, and an EGR valve 45 that is provided in the EGR passage 44A. The EGR passage 44A connects a portion of the exhaust passage 40 on an upstream side of the turbine 48 and a portion between the intercooler 33 and the surge tank 34 in the intake passage 30. The EGR valve 45 is a valve capable of opening and closing the EGR passage 44A. An amount of EGR gas that is circulated into the intake passage 30, and hence, an amount of the EGR gas that is introduced into the cylinder 2 (the combustion chamber 6) varies according to an opening degree of the EGR valve 45. In the EGR passage 44A, an EGR cooler (not illustrated) is provided to cool the exhaust gas (the EGR gas) that is circulated from the exhaust passage 40 into the intake passage 30 by heat exchange.

(2) Control System

Figure 5:
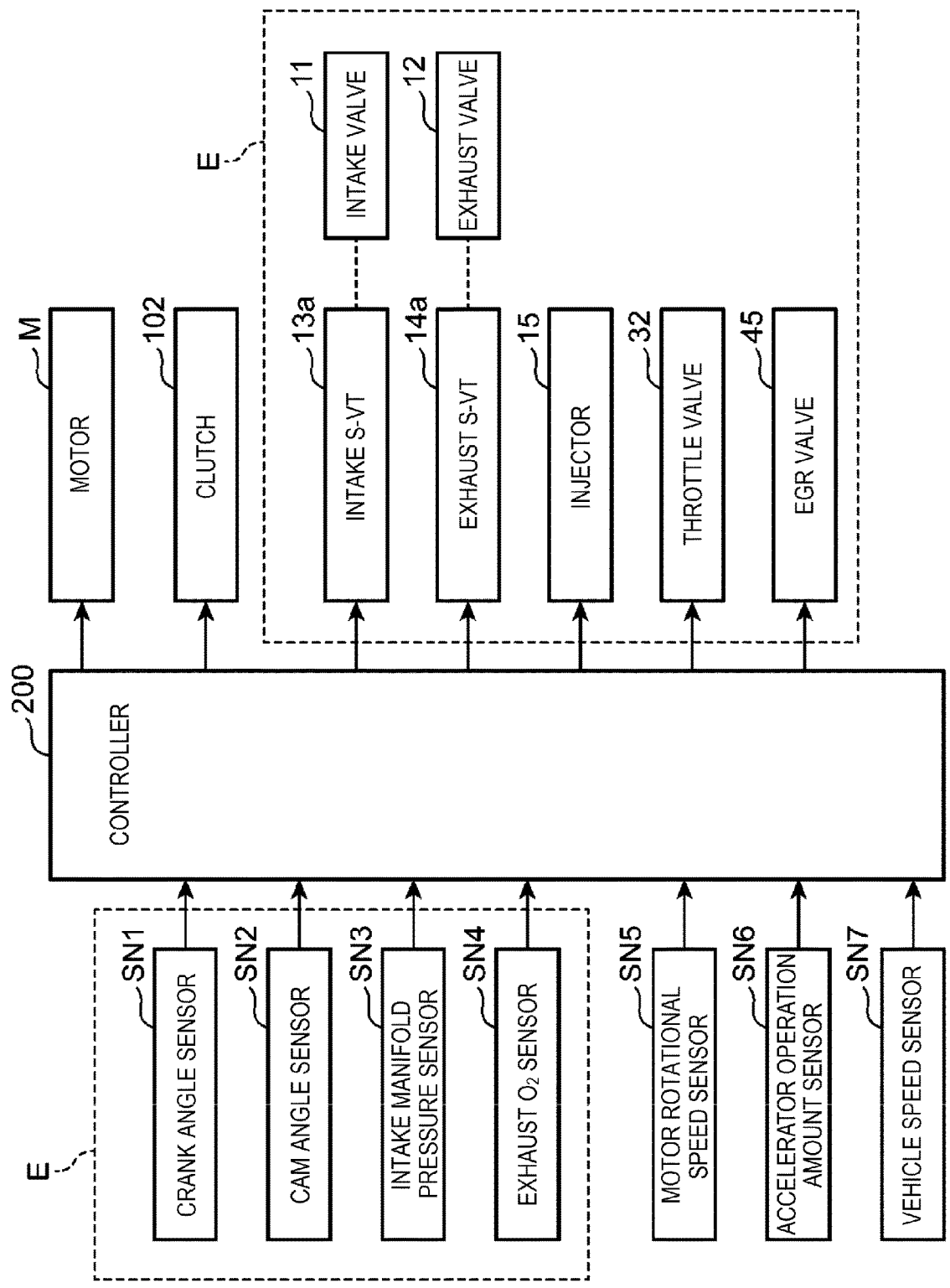
FIG. 5 is a block diagram illustrating a control system for the engine.

FIG. 5 is a block diagram illustrating a control system of the vehicle 100. A controller 200 illustrated in FIG. 5 is a microcomputer that integrally controls the motor M, the engine E, and the like, and is constructed of a processor (e.g., a central processing unit (CPU), memory (e.g., ROM and/or RAM), which are well-known, and the like. The controller 200 is an example of a "control device" in the present disclosure.

The controller 200 receives detection signals from various sensors that are provided in the vehicle 100.

More specifically, in the cylinder block 3 of the engine E, a crank angle sensor SN1 is provided to detect a rotation angle of the crankshaft 7, that is, an engine speed. In the cylinder head 4 of the engine E, a cam angle sensor SN2 is provided to detect an angle of an intake cam that is provided in the intake valve mechanism 13. The controller 200 determines which cylinder is in what stroke on the basis of the detection signal of the cam angle sensor SN2 and the detection signal of the crank angle sensor SN1. In a portion of the intake passage 30 of the engine E on a downstream side of the throttle valve 32, an intake manifold pressure sensor SN3 is provided to detect a pressure of the intake air flowing through this portion. Hereinafter, the pressure of the intake air that flows through the portion of the intake passage 30 on the downstream side of the throttle valve 32 will be referred to as an intake manifold pressure. The intake air described in the present specification refers to the gas that is introduced into the cylinder 2 (the combustion chamber 6) and, when the EGR gas is introduced in addition to the air into the cylinder 2, refers to gas containing the EGR gas and the air. In the exhaust passage 40 of the engine E, an exhaust $O_2$ sensor SN4 is provided to detect exhaust $O_2$ concentration that is concentration of oxygen contained in the exhaust gas flowing through the exhaust passage 40. The exhaust $O_2$ sensor SN4 is arranged between the turbine 48 and the exhaust purifier 41. The vehicle 100 is also provided with a motor rotational speed sensor SN5 that detects a rotational speed of the motor M, an accelerator operation amount sensor SN6 that detects an accelerator operation amount that is an operation amount of an accelerator pedal operated by a driver who drives the vehicle 100, a vehicle speed sensor SN7 that detects a vehicle speed, and the like. The controller 200 sequentially receives the information detected by these sensors SN1 to SN7.

The controller 200 makes various determinations, calculations, and the like on the basis of the input information from each of the sensors to control sections of the engine E, such as the intake S-VT 13a, the exhaust S-VT 14a, the injector 15, the throttle valve 32, and the EGR valve 45, the motor M, the clutch 102, and the like.

In this embodiment, the intake valve 11 is configured to be always closed on a retarded side from the intake bottom dead center BDCi during operation of the engine E, and the controller 200 controls the intake S-VT 13a to achieve this.

In addition, in this embodiment, a basic travel mode of the vehicle 100 is set to an EV mode in which the wheel 101 is driven only by the motor M, and the mode is switched to an engine drive mode in which the engine E is driven only when the output of the motor M alone is insufficient, or the like. The controller 200 switches the travel mode on the basis of the vehicle speed and the like.

More specifically, the controller 200 determines, from a travel state of the vehicle 100 and an operation state of the accelerator pedal, whether an engine start condition as a condition to start the engine E is satisfied or whether an engine stop condition as a condition to stop the engine E is satisfied. For example, the controller 200 determines that the engine start condition is satisfied when, during the stop of the engine E, the vehicle speed becomes equal to or higher than a specified engine start speed and the operation amount of the accelerator pedal becomes equal to or larger than a specified engine start operation amount. Meanwhile, the controller 200 determines that the engine stop condition is satisfied when, during driving of the engine E, the vehicle speed becomes lower than a specified engine stop speed or the operation amount of the accelerator pedal becomes smaller than a specified engine stop operation amount. The controller 200 sequentially determines whether each of the above conditions is satisfied on the basis of detection results of the vehicle speed sensor SN7 and the accelerator operation amount sensor SN6, and the like.

If determining that the engine start condition is satisfied, the controller 200 executes an engine start control to start the engine E. In the engine start control, the controller 200 first shifts the clutch 102 from a disengaged state to an engaged state. When the clutch 102 is brought into the engaged state, the output of the motor M is transmitted to the engine E. In this way, the engine E is forcibly and rotationally driven by the motor M. That is, the engine E starts cranking. When cranking starts, next, the controller 200 injects an initial fuel amount from the injector 15 during the compression stroke of the cylinder 2, which has been stopped near the intake bottom dead center BDCi, to cause self-ignited combustion thereof. Thereafter, the engine start control is shifted to a normal engine control, and the controller 200 sequentially injects the fuel from the injector 15 into each of the cylinders 2. Here, as described above, the clutch 102 is brought into the engaged state. In this way, drive power of the engine E is transmitted to the wheel 101 via the motor M, the transmission 104, and the like.

Meanwhile, if determining that the engine stop condition is satisfied, the controller 200 executes an engine stop control to stop the engine E. In the engine stop control, the controller 200 first performs a fuel cut to stop the fuel supply from the injector 15 to each of the cylinders 2. By stopping the fuel supply, the engine speed is reduced, and the engine is eventually stopped. Here, when the engine speed becomes low, the engine body 1 and an engine mount that supports the engine body 1 can possibly resonate and increase vibration of the engine body 1. Thus, as the engine stop control, the controller 200 executes a control for fully closing the throttle valve 32. In other words, the engine speed is promptly reduced by fully closing the throttle valve 32, so as to shorten a period in which the engine speed becomes a resonance speed. More specifically, in the case where the engine speed becomes equal to or lower than a specified throttle valve closing speed N1 after the fuel cut, the controller 200 closes the throttle valve 32 until the throttle valve 32 is fully closed. In addition, in the case where the engine E is stopped (the speed of the engine E becomes 0) at the time when the engine stop condition is satisfied, the controller 200 switches the clutch 102 from the engaged state to the disengaged state.

(Engine Stop Position Control)

Next, a description will be made on the stop position control that is executed by the controller 200 after the engine stop control is executed, that is, after the fuel cut is performed and the throttle valve 32 is fully closed. The stop position control is a control for setting the position of each of the cylinders 2 (the piston 5 in each of the cylinders 2) during the stop of the engine E within a specified target range.

Hereinafter, a time in which the engine E is stopped, in detail, a time in which the engine speed is 0 and the engine E is completely stopped will simply be referred to as an engine stop time. In addition, the position of each of the cylinders 2 (the piston 5 in each of the cylinders 2) in the engine stop time will be referred to as a cylinder stop position.

In the present disclosure, the cylinder whose stroke in the engine stop time (when the engine E is completely stopped) is the compression stroke and in which the position of the piston 5 is located within a range from the compression top dead center (TDCc) to 120° CA before the compression top dead center (BTDCc) will be referred to as a stop-time compression stroke cylinder. In addition, the cylinder whose combustion order is one stroke before that of the stop-time compression stroke cylinder, whose stroke at the engine stop (when the engine E is completely stopped) is the expansion stroke, and in which the position of the piston 5 falls within a range from the compression top dead center (TDCc) to 120° CA after the compression top dead center (ATDCc) will be referred to as a stop-time expansion stroke cylinder. Furthermore, the cylinder whose combustion order is one stroke after that of the stop-time compression stroke cylinder, whose stroke at the engine stop (when the engine E is completely stopped) is the intake stroke or the compression stroke, and in which the position of the piston 5 falls within a range from 60° CA before intake bottom dead center (BBDCi) to 60° CA after the intake bottom dead center (ABDCi) will be referred to as a stop-time compression transition cylinder.

Figure 6:
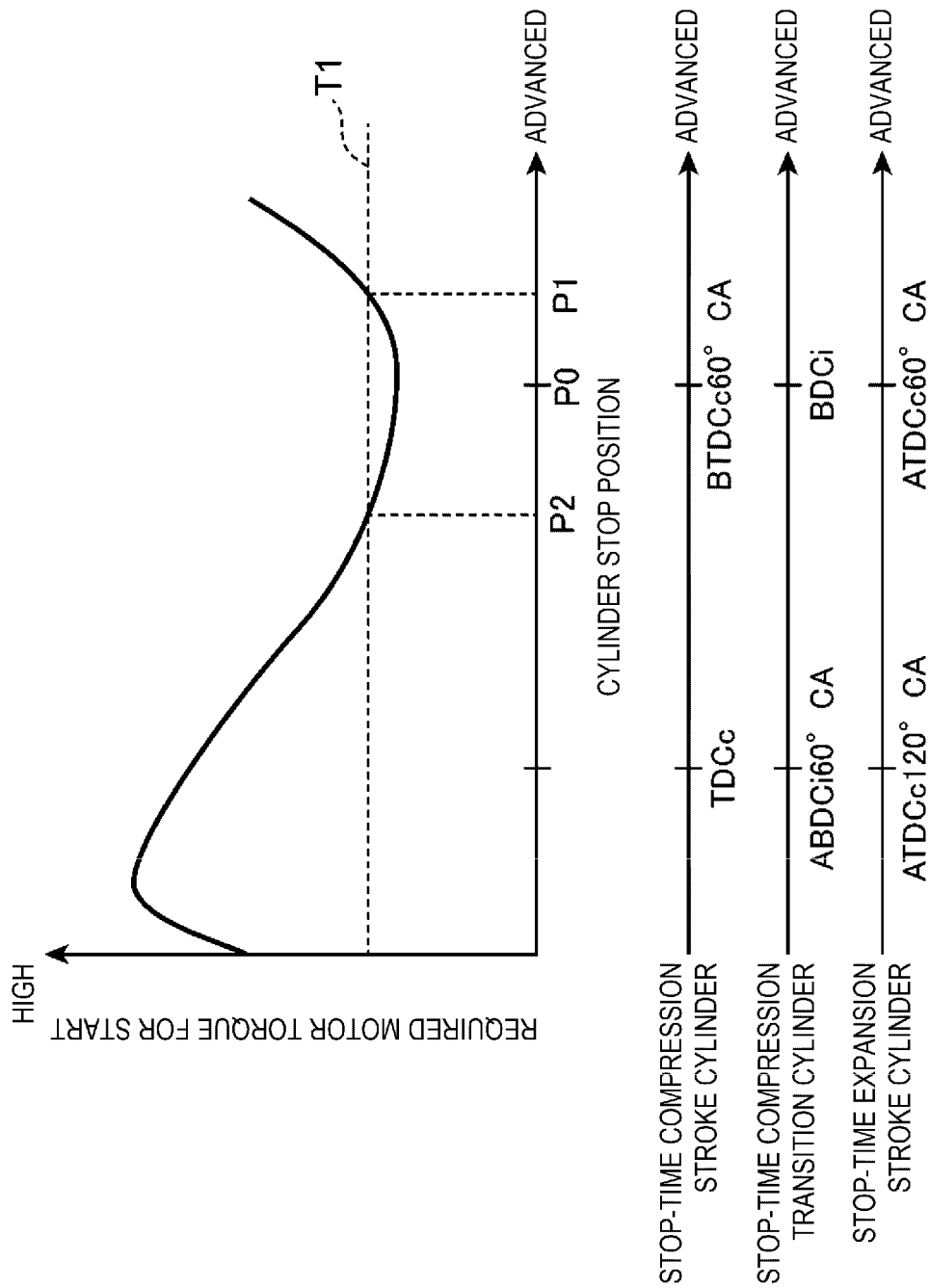
FIG. 6 is a graph illustrating a relationship between a cylinder stop position and motor torque required for an engine start.
Figure 7:
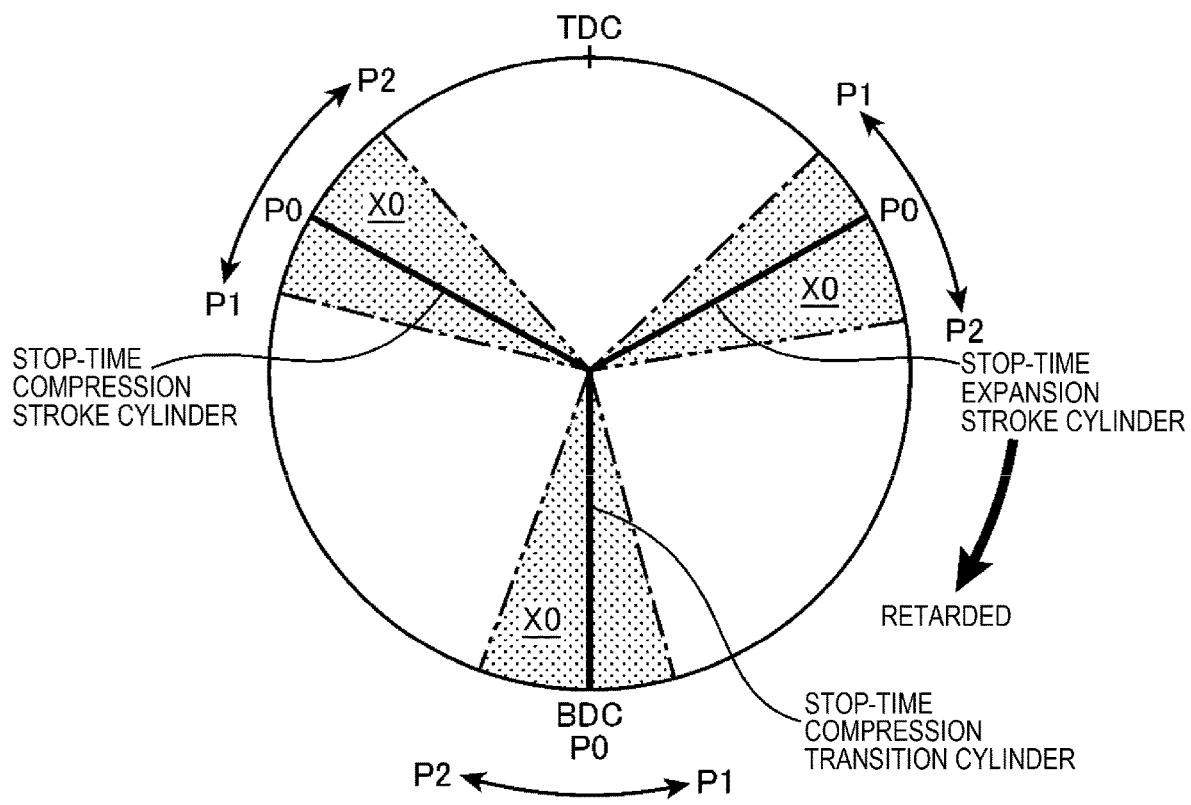
FIG. 7 is a graph illustrating a target range of the cylinder stop position.

FIG. 6 is a graph illustrating a relationship between the cylinder stop position and a minimum value of torque of the motor M that is required to start the engine E, which has been stopped at this cylinder stop position, (hereinafter appropriately referred to as starting torque). A horizontal axis of FIG. 6 also indicates positions of the stop-time compression stroke cylinder, the stop-time compression transition cylinder, and the stop-time expansion stroke cylinder. FIG. 7 is a graph illustrating the target range of the cylinder stop position and a stop position of each of the stop-time compression stroke cylinder, the stop-time compression transition cylinder, and the stop-time expansion stroke cylinder corresponding thereto. FIG. 7 illustrates the position of each of the cylinders 2 (the position of the piston 5 in each of the cylinders 2) such that the highest point of a circle is set as top dead center (TDC), the lowest point thereof is set as bottom dead center (BDC), and the position of the piston 5 moves to the retarded side as the target range moves clockwise.

As illustrated in FIG. 6, the starting torque varies by the cylinder stop position. The cylinder stop position where the starting torque becomes a minimum amount is a position indicated by a solid line in FIG. 6, is a position at which the stop-time compression stroke cylinder is located at 60° CA before the compression top dead center (BTDCc), is a position at which the stop-time expansion stroke cylinder is located at 60° CA after the compression top dead center (ATDCc), and is a position at which the stop-time compression transition cylinder is at the intake bottom dead center (BDCi). In other words, the starting torque becomes the minimum amount when the pistons 5 in the stop-time compression stroke cylinder and the stop-time expansion stroke cylinder are located at the same position with respect to the top dead center. Hereinafter, the cylinder stop position at the time when this starting torque becomes the minimum amount will be referred to as an optimum position P0.

The target range of the cylinder stop position is a position at which the starting torque is equal to or lower than a specified reference torque T1, and is set as a range from a first position P1 on an advanced side from the optimum position P0 to a second position P2 on the retarded side from the optimum position P0. The reference torque T1 is set to a value between a maximum value and a minimum value of the starting torque. Corresponding to the above, the first position P1 is set at a position at which the position of the stop-time compression stroke cylinder is at 75° CA before the compression top dead center (BTDCc), the position of the stop-time compression transition cylinder is at 15° CA before the intake bottom dead center (BBDCi), and the position of the stop-time expansion stroke cylinder is at 45° CA after the compression top dead center (ATDCc). Meanwhile, the second position P2 is set at a position at which the position of the stop-time compression stroke cylinder is at 40° CA before the compression top dead center (BTDCc), the position of the stop-time compression transition cylinder is at 20° CA after the intake bottom dead center (ABDCi), and the position of the stop-time expansion stroke cylinder is at 80° CA after the compression top dead center (ATDCc).

Figure 8:
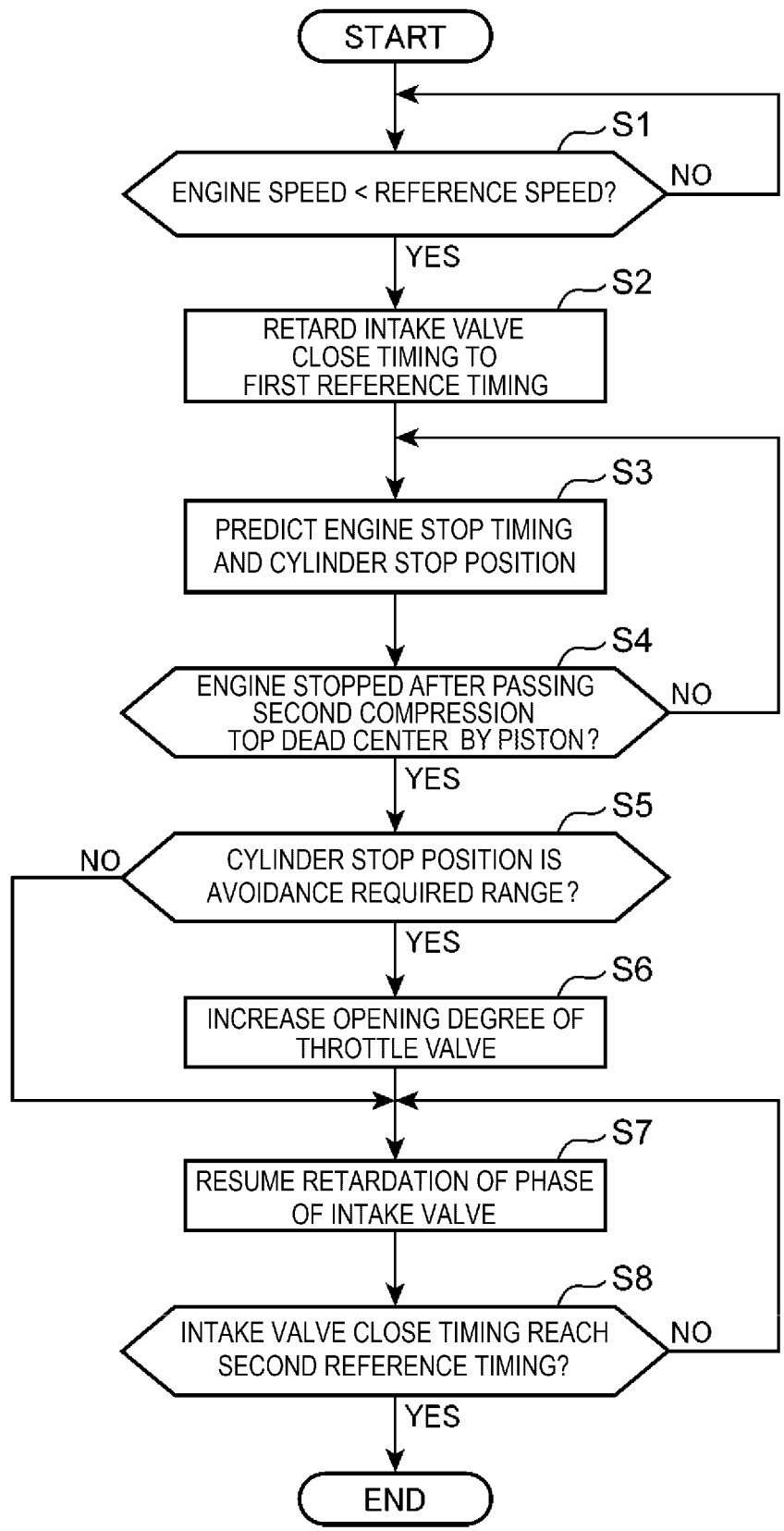
FIG. 8 is a flowchart illustrating a specific procedure of stop position control.

A description will be made on a specific procedure of the stop position control with reference to a flowchart in FIG. 8. Step S1 in the flowchart illustrated in FIG. 8 is executed after the engine stop control is performed.

In step S1, the controller 200 determines whether the engine speed is reduced to be lower than a reference speed N2. The controller 200 makes this determination on the basis of the detection result of the crank angle sensor SN1. The reference speed N2 is set in advance and stored in the controller 200. If the determination in step S1 is NO and it is determined that the engine speed is equal to or higher than the reference speed N2, the controller 200 repeats step S1 and waits until the engine speed becomes lower than the reference speed N2. On the other hand, if the determination in step S1 is YES and the controller 200 determines that the engine speed becomes lower than the reference speed N2, the processing proceeds to step S2.

In step S2, the controller 200 retards a phase of the intake valve 11 by the intake S-VT 13a so as to retard intake valve close timing IVC, which is close timing of the intake valve 11, to a first reference timing. The first reference timing is set in advance and stored in the controller 200. The first reference timing is set at timing on the retarded side from the intake valve close timing IVC immediately after execution of the engine stop control (immediately after execution of the control for fully closing the throttle valve 32) and on the advanced side from second reference timing, which will be described below. The first reference timing is an example of a "pre-valve close timing" in the present disclosure.

Next, in step S3, the controller 200 predicts engine stop timing, which is timing at which the engine E is stopped, and the cylinder stop position, that is, the position of each of the pistons 5 at the time when the engine E is stopped. The controller 200 predicts the above timing and position on the basis of the detection value of the intake manifold pressure sensor SN3, the detection value of the crank angle sensor SN1, the detection value of the cam angle sensor SN2, and the like. After step S3, the processing proceeds to step S4.

In step S4, the controller 200 determines whether the engine is stopped after the piston 5 passes second compression top dead center on the basis of the prediction result in step S3. More specifically, in step S4, the controller 200 determines whether there are two cylinders that pass the compression top dead center (TDCc) in a period from a current time point to time at which the engine is stopped.

If the determination in step S4 is NO and it is determined that the engine E is not stopped at timing after the piston 5 passes the second compression top dead center from the current time point, the processing returns to step S3, and the controller 200 continues to predict the engine stop timing and the cylinder stop position.

Figure 9:
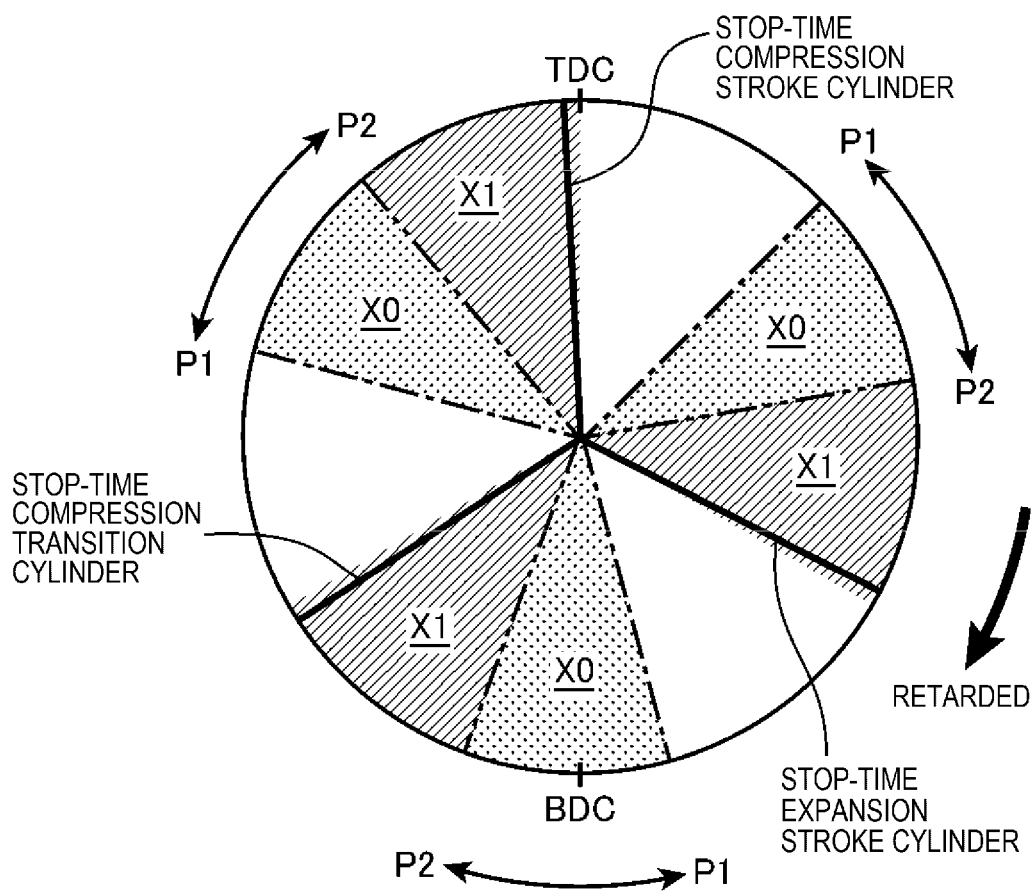
FIG. 9 is a graph illustrating an avoidance required range of the cylinder stop position.

On the other hand, if the determination in step S4 is YES and the controller 200 determines that the engine is stopped after the piston 5 passes the second compression top dead center, the processing proceeds to step S5. In step S5, the controller 200 determines whether the cylinder stop position that is predicted in step S3 (hereinafter referred to as a predicted cylinder stop position) falls within an avoidance required range X1. As illustrated in FIG. 9, the avoidance required range X1 is a range on the retarded side of a target range X0, and is set as a range from a state where the piston 5 in the stop-time compression stroke cylinder is located at a position on the most retarded side in the target range X0 (40° CA before the compression top dead center (BTDCc) corresponding to the second position P2) to a state where the piston 5 in the stop-time compression stroke cylinder reaches the compression top dead center (TDCc). That is, in step S5, it is determined whether a predicted stop position of the stop-time compression stroke cylinder is a position that is closer to the top dead center (the compression top dead center TDCc) than the target range thereof.

If the determination in step S5 is YES and it is determined that the predicted cylinder stop position falls within the avoidance required range X1 (if it is determined that the predicted stop position of the stop-time compression stroke cylinder is on the top dead center side from the target range X0), in step S6, the controller 200 increases the opening degree of the throttle valve 32. In this embodiment, the controller 200 increases the opening degree of the throttle valve 32 such that an increase amount of the opening degree of the throttle valve 32 is increased as a shifting amount of the predicted cylinder stop position from the target range X0 (the second position P2) is increased. After step S6, the processing proceeds to step S7.

On the other hand, if the determination in step S5 is NO and the controller 200 determines that the predicted cylinder stop position does not fall within the avoidance required range X1 (if it is determined that the predicted stop position of the stop-time compression stroke cylinder is not on the top dead center side from the target range X0), the processing proceeds to step S7.

In step S7, the controller 200 resumes retardation of the phase of the intake valve 11, that is, retardation of the intake valve close timing IVC by the intake S-VT 13a. More specifically, the controller 200 controls the intake S-VT 13a such that the phase of the intake valve 11 is retarded at a specified speed. Here, in the flowchart illustrated in FIG. 8, step S7 is executed after steps S5, S6. However, step S5 and step S7 are executed almost simultaneously. Immediately after the determination in step S4 is YES and it is determined that the engine is stopped after the piston 5 passes the second compression top dead center, the controller 200 executes step S7.

The above retardation speed is set to such a speed that, when the retardation of the phase of the intake valve 11 is started in association with the determination that the engine is stopped after the piston 5 passes the second compression top dead center, the intake valve close timing IVC reaches second reference timing, which is on the retarded side of the first reference timing, for the first time beyond the intake valve close timing IVC of the stop-time compression stroke cylinder (in detail, the phase of the intake valve 11 reaches a phase in which the intake valve close timing IVC becomes the second reference timing). For example, the second reference timing is set as timing on the most retarded side of timing that the intake valve close timing IVC can take, and the above speed is set to such a speed that the intake valve close timing IVC is changed from the first reference timing to the second reference timing over a period corresponding to 300° CA. After step S5, the processing proceeds to step S6. Here, the timing at which the determination Yes is made in above step S4, that is, the timing at which it is determined the engine is stopped after the piston 5 passes the second compression top dead center is an example of a "specified timing" in the present disclosure.

In step S8, the controller 200 determines whether the intake valve close timing IVC has reached the second reference timing. The controller 200 makes this determination on the basis of the detection result of the cam angle sensor SN2.

If the determination in step S8 is NO and it is determined that the intake valve close timing IVC has not reached the second reference timing, the processing returns to step S7, and the controller 200 continues the retardation of the phase of the intake valve 11.

On the other hand, if the determination in step S8 is YES and it is determined that the intake valve close timing IVC has reached the second reference timing, the controller 200 terminates the processing (the stop position control).

(Operation and the Like)

Figure 10:
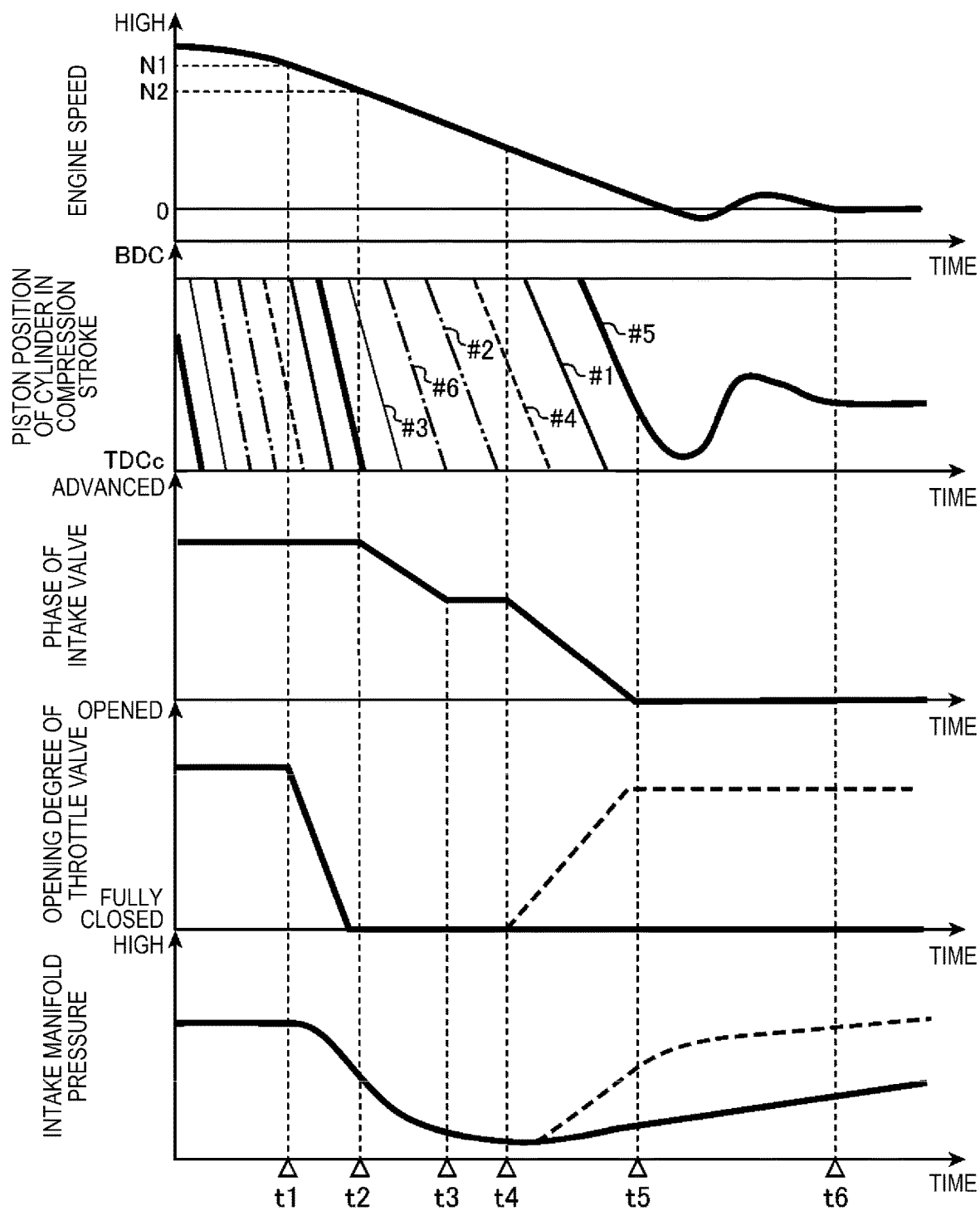
FIG. 10 is a time chart illustrating a temporal change in each parameter when the stop position control is executed.

FIG. 10 is a time chart schematically illustrating a temporal change in each parameter when the above stop position control is executed. FIG. 10 illustrates, in an order from top to bottom, time charts of the engine speed, the position of the piston 5 in the cylinder in the compression stroke, the phase of the intake valve 11, the opening degree of the throttle valve 32, and the intake manifold pressure. FIG. 10 also illustrates the temporal change in each of the parameters after the fuel cut.

As illustrated in FIG. 10, after the fuel cut is performed, the engine speed is gradually reduced. In the example illustrated in FIG. 10, the engine speed becomes equal to or lower than the throttle valve closing speed N1 at time t1. In association therewith, the throttle valve 32 starts being closed at time t1, and thereafter the throttle valve 32 is fully closed. In the example illustrated in FIG. 10, the engine speed becomes lower than the reference speed N2 at time t2 after the throttle valve 32 is closed. In association therewith, the phase of the intake valve 11 is retarded at the time t2. More specifically, as described above, the controller 200 retards the phase of the intake valve 11 by the intake S-VT 13a so as to retard the intake valve close timing IVC to the first reference timing. Here, there is a delay in the phase change of the intake valve 11. Thus, the intake valve close timing IVC does not reach the first reference timing immediately but eventually reaches the first reference timing at time t3. Once reaching the first reference timing, the intake valve close timing IVC is maintained at the first reference timing for a while.

In the example illustrated in FIG. 10, at time t4 after the time t3, it is determined that the engine E is stopped after the piston 5 passes the second compression top dead center. More specifically, in the example illustrated in FIG. 10, the engine E is stopped after the fourth cylinder 2D and the first cylinder 2A pass the compression top dead center (TDCc) and before the fifth cylinder 2E reaches the compression top dead center (TDCc) (without the fifth cylinder 2E reaching the compression top dead center (TDCc)), and it is determined that the engine E is stopped after the piston 5 passes the second compression top dead center at the time t4 immediately after the second cylinder 2B, whose combustion order is one stroke before that of the fourth cylinder 2D passes the compression top dead center (TDCc).

When it is determined that the engine E is stopped after the piston 5 passes the second compression top dead center, in association therewith, at the time t4, the retardation of the phase of the intake valve 11, that is, the retardation of the intake valve close timing IVC is resumed. As described above, the intake valve close timing IVC at this time is retarded such that the intake valve close timing IVC reaches the second reference timing at later timing than the intake valve close timing IVC of the stop-time compression stroke cylinder. In the example illustrated in FIG. 10, the intake valve close timing IVC reaches the second reference timing at time t5 that is later than the intake valve close timing IVC of the fifth cylinder 2E as the stop-time compression stroke cylinder. After the time t5, the intake valve close timing IVC is maintained at the second reference timing. Then, at time t6 after the time t5, the engine E is completely stopped.

Here, solid lines in FIG. 10 are those in an example of a case where it is determined that the predicted cylinder stop position is not the avoidance required range X1 at the time t4, at which it is determined that the engine E is stopped after the piston 5 passes the second compression top dead center. In this case, even after the time t4, the throttle valve 32 is maintained to be fully closed.

Meanwhile, broken lines in FIG. 10 are those in an example of a case where it is determined at the time t4 that the predicted cylinder stop position falls within the avoidance required range X1. In this case, the throttle valve 32 is opened at the time t4. Then, in this case, the intake manifold pressure is significantly increased along with opening of the throttle valve 32.

Figure 11:
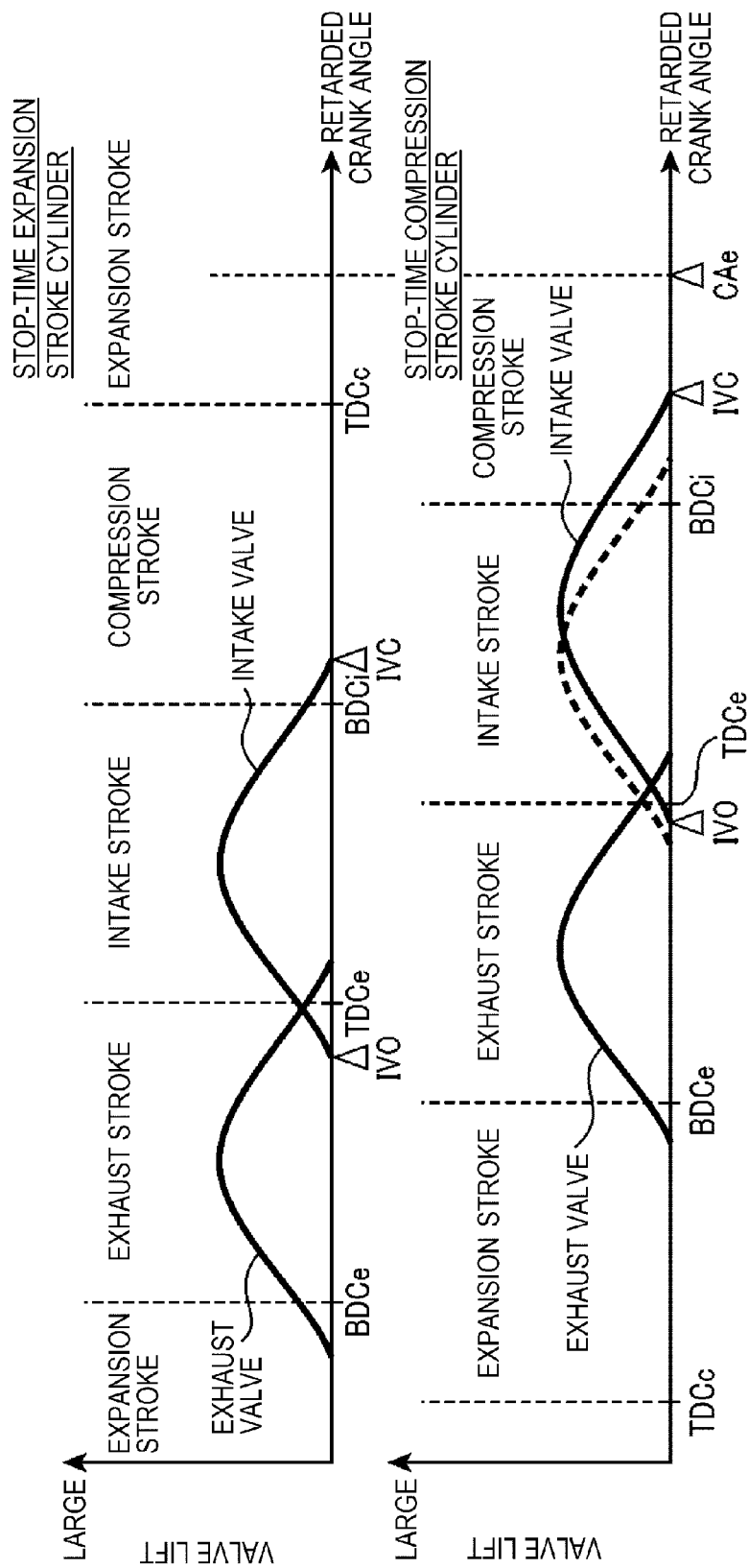
FIG. 11 is a view illustrating valve lifts of a stop-time expansion stroke cylinder and a stop-time compression stroke cylinder immediately before an engine stop during execution of the stop position control.

As it has been described so far, in the embodiment, in the case where it is determined that the engine E is stopped after the piston 5 passes the second compression top dead center, the phase of the intake valve 11 is retarded until passing the intake valve close timing IVC of the stop-time compression stroke cylinder, and the intake valve close timing IVC is retarded. FIG. 11 is a graph illustrating valve lifts of each of the intake valves 11 and each of the exhaust valves 12 in the stop-time compression stroke cylinder and the stop-time expansion stroke cylinder immediately before the engine stop. In the graph of the stop-time compression stroke cylinder illustrated in FIG. 11, solid lines indicate the valve lift of the intake valve 11 in such a cylinder immediately before the engine stop, and a broken line indicates the valve lift of the intake valve 11 in the stop-time expansion stroke cylinder immediately before the engine stop. Immediately before the engine is stopped, the intake stroke of the stop-time compression stroke cylinder is performed after the intake stroke of the stop-time expansion stroke cylinder. Accordingly, since the phase of the intake valve 11 and the intake valve close timing IVC are retarded as described above, the intake valve close timing IVC of the stop-time compression stroke cylinder immediately before the engine stop becomes the timing on the retarded side from the intake valve close timing IVC of the stop-time expansion stroke cylinder immediately before the engine stop. Then, immediately before the engine stop, the crank angle from the intake bottom dead center (BDCi) to the intake valve close timing IVC, that is, the retarded amount of the intake valve close timing IVC from the intake bottom dead center (BDCi) is larger for the stop-time compression stroke cylinder than for the stop-time expansion stroke cylinder. In this way, according to the above embodiment, it is possible to suppress shifting of the stop-time compression stroke cylinder to the bottom dead center side from the target range X0 and to reduce the torque of the motor M that is consumed at the start of the engine E.

More specifically, as illustrated in FIG. 10, when the throttle valve 32 starts being closed at the time t2, the intake manifold pressure is reduced. In addition, even after the throttle valve 32 is fully closed, the intake manifold pressure is reduced in association with the reduction in the engine speed. By the way, as indicated by the solid lines in FIG. 10, even when the throttle valve 32 is maintained in the fully closed state, the intake manifold pressure is increased from timing near the time t4 immediately before the engine stop.

Figure 12:
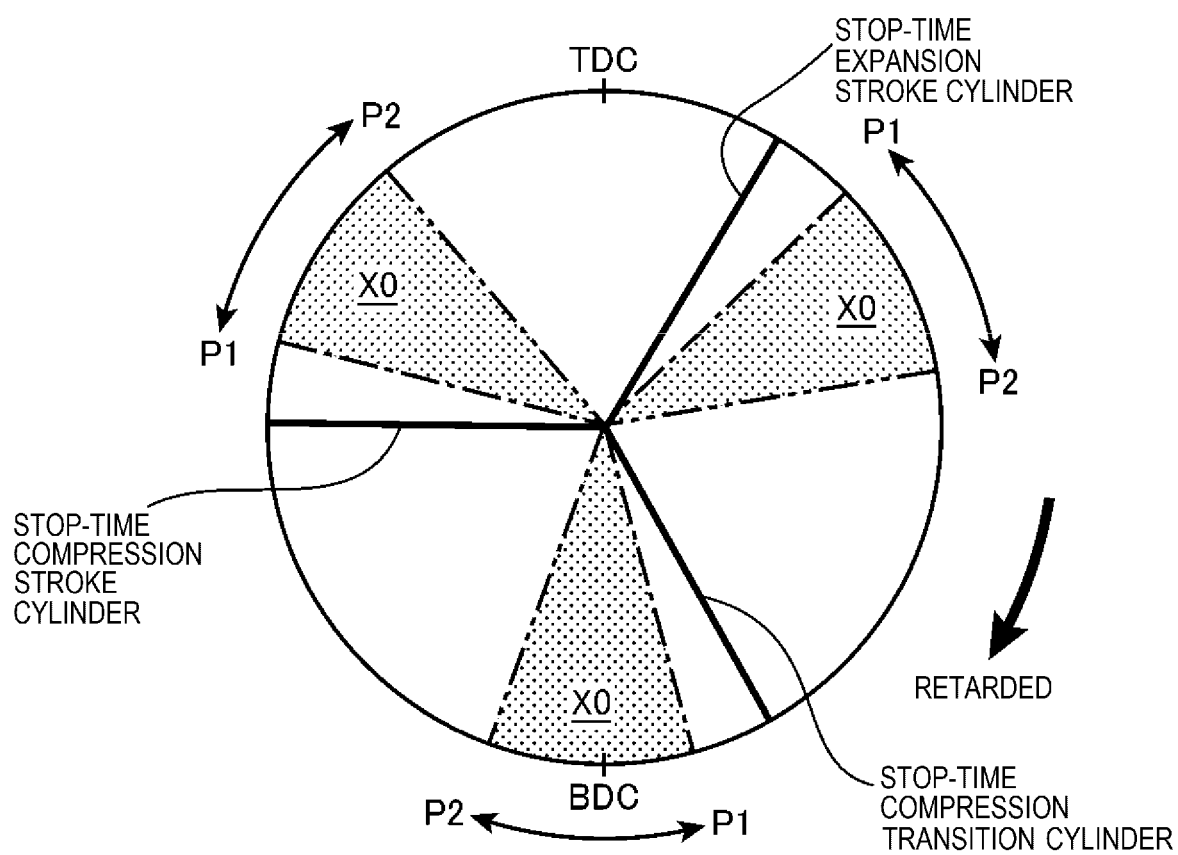
FIG. 12 is a graph illustrating a stop position of each of the cylinders at the time when the cylinder stop position of the stop-time compression stroke cylinder is shifted to bottom dead center side from a target range.

Here, if the intake valve close timing IVC is maintained at constant timing in the state where the intake manifold pressure is increased as described above, the intake amount of the stop-time compression stroke cylinder, whose intake stroke is performed after that of the stop-time expansion stroke cylinder, will become larger than the intake amount of the stop-time expansion stroke cylinder. Accordingly, in the case where the intake valve close timing IVC is maintained to be constant, a force that is applied to the piston 5 in the stop-time compression stroke cylinder from the intake air becomes larger than a force that is applied to the piston 5 in the stop-time expansion stroke cylinder from the intake air. In this way, in the case where the intake valve close timing IVC is maintained to be constant, the stop position of the stop-time compression stroke cylinder is located below the stop position of the stop-time expansion stroke cylinder. As indicated by solid lines in FIG. 12, the cylinder stop positions are shifted to the advanced side from the target range X0.

It is considered that a reason why the intake manifold pressure is increased immediately before the engine stop is because a suction force of the intake air by the engine body 1 is reduced when the engine speed is reduced near 0. In particular, as described above, when the control for fully closing the throttle valve 32 is executed as the engine stop control, a pressure in the intake passage 30 becomes a negative pressure. Accordingly, in this case, the intake manifold pressure tends to be increased due to leakage of the intake air into the intake passage 30 from a portion around the throttle valve 32 or the like that is associated with the reduction in the suction force of the intake air by the engine body 1.

To handle such a problem, in the above embodiment, immediately before the engine stop, the retarded amount from the intake bottom dead center (BDCi) at the intake valve close timing IVC of the stop-time compression stroke cylinder is set to be larger than that at the intake valve close timing IVC of the stop-time expansion stroke cylinder. When the retarded amount of the intake valve close timing IVC from the intake bottom dead center BDCi is increased, a blow-back amount of the intake air from the inside of the cylinder 2 (the combustion chamber 6) to the intake port 9 is increased, and the intake amount in the cylinder 2 is reduced. Thus, according to the above embodiment, immediately before the engine stop, it is possible to suppress the intake amount of the stop-time compression stroke cylinder from being increased in association with the increase in the intake manifold pressure by increasing the blow-back amount of the stop-time compression stroke cylinder to be larger than the blow-back amount of the intake air to the intake port 9 of the stop-time expansion stroke cylinder. As a result, it is possible to prevent the force applied to the piston 5 of the stop-time compression stroke cylinder from the intake air from becoming excessively larger than the force applied to the piston 5 of the stop-time expansion stroke cylinder from the intake air, and it is thus possible to suppress the stop-time compression stroke cylinder from being shifted to the bottom dead center side from the target range X0.

In the above embodiment, prior to the retardation of the intake valve close timing IVC in association with the determination that the engine E is stopped after the execution of the engine stop control and after the piston 5 passes the second compression top dead center, the intake valve close timing IVC is once retarded to the first reference timing. Accordingly, it is possible to reliably increase the retarded amount from the intake bottom dead center (BDCi) of the intake valve close timing IVC of the stop-time compression stroke cylinder immediately before the engine stop by avoiding such a situation where the intake valve close timing IVC of the stop-time compression stroke cylinder is not sufficiently retarded due to a delay in driving of the intake S-VT 13a. Thus, it is possible to further reliably set the cylinder stop position at the position within the target range X0.

Here, as described above, shifting of the cylinder stop position from the target range X0 is suppressed by the retardation of the intake valve close timing IVC. However, depending on a degree of the reduction in the engine speed immediately before the engine stop, and the like, there is a possibility that the piston 5 in the stop-time compression stroke cylinder is not sufficiently lifted immediately before the engine stop and thus the stop position of the cylinder is located on the top dead center side from the target range X0. To handle such a problem, in the above embodiment, the opening degree of the throttle valve 32 is increased in the case where it is predicted that the stop position of the stop-time compression stroke cylinder is located on the top dead center side from the target range X0. When the opening degree of the throttle valve 32 is increased, the intake manifold pressure is increased as indicated by the broken line in FIG. 10. Accordingly, it is possible to increase the intake amount of the stop-time compression stroke cylinder, whose intake stroke is performed later than the stop-time expansion stroke cylinder, and it is thus possible to suppress the piston 5 in the stop-time compression stroke cylinder from being lifted. Thus, according to the above embodiment, it is possible to suppress the position of the stop-time compression stroke cylinder from being shifted to the top dead center side from the target range X0, and it is thus possible to further reliably set the cylinder stop position at the position within the target range X0 and further reliably reduce torque of start means consumed for the start of the engine E.

(Modified Embodiments)

In the above embodiment, the description has been made on the case where the phase of the intake valve 11 and the intake valve close timing IVC are retarded after it is determined that the engine E is stopped after the piston 5 passes the second compression top dead center, and the retarded amount from the intake bottom dead center BDCi of the intake valve close timing IVC of the stop-time compression stroke cylinder immediately before the engine stop is thereby increased to be larger than the retarded amount of the stop-time expansion stroke cylinder immediately before the engine stop. However, a specific configuration is not limited to the above as long as this relationship of the retarded amounts is established. For example, the intake S-VT 13a may be driven to retard the phase of the intake valve 11 after the intake valve close timing IVC of the stop-time expansion stroke cylinder immediately before the engine stop. In this way, the retarded amount of the stop-time compression stroke cylinder immediately before the engine stop may be increased to be larger than the retarded amount of the stop-time expansion stroke cylinder immediately before the engine stop.

In addition, in the above embodiment, the description has been made on the case where the intake valve close timing IVC is once retarded to the first reference timing when the engine speed becomes lower than the specified reference speed N2. However, the timing at which the intake valve close timing IVC is once retarded to the first reference timing is not limited to the above timing as long as such timing falls within a period after the fuel cut and until the retardation of the phase of the intake valve 11 is resumed. Furthermore, this control for once retarding the intake valve close timing IVC to the first reference timing may be omitted.

In the above embodiment, the description has been made on the case where the engine E is the six-cylinder engine having the six cylinders 2. However, the number of cylinders in the engine E is not limited thereto and may be four or the like.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 engine body
2 cylinder
5 piston
7 crankshaft
11 intake valve
13a intake S-VT (variable valve timing mechanism, VVT)
15 injector
30 intake passage
32 throttle valve 200 controller (control device)
E engine
M motor

The invention claimed is:

1. A stop position controller provided for an engine including a plurality of cylinders a plurality of intake ports, each of which communicates with a respective one of the cylinders; a plurality of intake valves, each of which opens and closes a respective one of the intake ports; a plurality of injectors that supply fuel to a respective one of the cylinders; a piston that is provided in each of the cylinders in a reciprocal manner; a crankshaft that rotates in an interlocking manner with reciprocating motion of the piston; and a motor capable of forcibly starting the engine by causing the crankshaft to rotate, the stop position controller comprising:

an intake variable valve timing mechanism (VVT) that collectively changes an intake valve close timing as a close timing of the plurality of intake valves; and a control device that controls the engine including the injectors and the intake VVT, wherein when a specified engine stop condition is satisfied, the control device performs a fuel cut to stop a fuel supply into the cylinders by the injectors and, after the fuel cut, controls the intake VVT such that a retarded amount of the intake valve close timing immediately before a stop of a stop-time compression stroke cylinder, which is the cylinder stopped in a compression stroke, from intake bottom dead center is larger than a retarded amount of the intake valve close timing immediately before a stop of a stop-time expansion stroke cylinder, which is the cylinder stopped in an expansion stroke, from the intake bottom dead center.

2. The stop position controller according to claim 1, wherein in a case where an engine speed becomes lower than a specified reference speed after the fuel cut, the control device retards the intake valve close timing to a specified pre-valve close timing by the intake VVT, and after the intake valve close timing reaches the pre-valve close timing and a specified timing arrives, retards the intake valve close timing from the pre-valve close timing by the intake VVT.

3. The stop position controller according to claim 2, wherein the engine includes a throttle valve that opens and closes an intake passage communicating with the plurality of intake ports, and the control device predicts a stop position of the stop-time compression stroke cylinder after the fuel cut and increases an opening degree of the throttle valve when predicting that the stop position of the stop-time compression stroke cylinder is on a top dead center side from a specified target range.

4. The stop position controller according to claim 3, wherein the engine has six of the cylinders, and the target range is set to a range of 40 degrees or larger before compression top dead center and 75 degrees or smaller before the compression top dead center in crank angle.

5. The stop position controller according to claim 1, wherein the engine includes a throttle valve that opens and closes an intake passage communicating with the plurality of intake ports, and the control device predicts a stop position of the stop-time compression stroke cylinder after the fuel cut and increases an opening degree of the throttle valve when predicting that the stop position of the stop-time compression stroke cylinder is on a top dead center side from a specified target range.

6. The stop position controller according to claim 5, wherein the engine has six of the cylinders, and the target range is set to a range of 40 degrees or larger before compression top dead center and 75 degrees or smaller before the compression top dead center in crank angle.

7. The stop position controller according to claim 3, wherein the control device controls the intake VVT such that a phase of the intake valves is retarded at a specified retardation speed when the control device determines that the predicted cylinder stop position does not fall within the specified target range.

8. The stop position controller according to claim 7, wherein the specified retardation speed is set such that, when the retardation of the phase of the intake valves is started after the piston of the stop-time compression stroke cylinder passes a second compression top dead center, the intake valve close timing reaches a second reference timing, which is on the retarded side of a first reference timing, for the first time beyond the intake valve close timing.

9. The stop position controller according to claim 8, wherein the control device determines whether the intake valve close timing has reached the second reference timing, on the basis of a detection result of a cam angle sensor, and if it is determined that the intake valve close timing has not reached the second reference timing, the control device continues the retardation of the phase of the intake valves.

* * * * *